(12) United States Patent
Zhang

(10) Patent No.: US 11,870,710 B2
(45) Date of Patent: Jan. 9, 2024

(54) INTER-DEVICE REQUESTS AND COMMUNICATION

(71) Applicant: Samsung Electronics Company, Ltd., Gyeonggi-do (KR)

(72) Inventor: Haichao Zhang, Santa Clara, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/834,118

(22) Filed: Jun. 7, 2022

(65) Prior Publication Data

US 2023/0224259 A1    Jul. 13, 2023

Related U.S. Application Data

(60) Provisional application No. 63/298,011, filed on Jan. 10, 2022.

(51) Int. Cl.
*H04L 67/146* (2022.01)
*H04L 47/70* (2022.01)
*H04L 67/56* (2022.01)

(52) U.S. Cl.
CPC ............ *H04L 47/82* (2013.01); *H04L 67/146* (2013.01); *H04L 67/56* (2022.05)

(58) Field of Classification Search
CPC ........ H04L 47/82; H04L 67/146; H04L 67/56
See application file for complete search history.

(56) References Cited

U.S. PATENT DOCUMENTS

| | | | |
|---|---|---|---|
| 10,447,748 B2* | 10/2019 | Bendahan | H04L 65/60 |
| 10,771,517 B2 | 9/2020 | Ein-Gil et al. | |
| 10,796,440 B2 | 10/2020 | Siminoff et al. | |
| 11,457,080 B1* | 9/2022 | Meduri | H04L 67/60 |
| 2015/0033219 A1* | 1/2015 | Breiner | G06F 8/61 |
| | | | 717/174 |
| 2018/0074843 A1 | 3/2018 | Smith | |
| 2019/0281105 A1* | 9/2019 | Panchapakesan | H04L 65/762 |

* cited by examiner

*Primary Examiner* — Gil H. Lee

(57) ABSTRACT

In one embodiment, a method includes receiving, at a proxy application on a first computing device, a request from a first application on the first computing device to access a resource. The method further includes transmitting, from the proxy application on the first computing device, a modified version of the request to a proxy application on a second computing device and receiving, from the proxy application on the second computing device, a response comprising data from the requested resource, where the resource is on the second computing device. The method further includes transmitting, to the first application on the first computing device, a response satisfying the first application's request to access the resource.

20 Claims, 6 Drawing Sheets

100

Receiving, at a proxy application on a first computing device, a request from a first application on the first computing device to access a resource
110

Transmitting, from the proxy application on the first computing device, a modified version of the request to a proxy application on a second computing device
120

Receiving, from the proxy application on the second computing device, a response including data from the requested resource, the resource being on the second computing device
130

Transmitting, to the first application on the first computing device, a response satisfying the first application's request to access the resource
130

Fig. 1

| Total Size (int) | Buffer Type: Intent.combined(int) | sessionID[] |
| Intent size (int) | Intent Byte Data [Intent size] | |
| Uri data size (int) | Uri data type- File/String... (int) | |
| Uri Resource Byte Data [Uri data size] | | |

Fig. 5

INTER-DEVICE REQUESTS AND COMMUNICATION

PRIORITY CLAIM

This application claims the benefit under 35 U.S.C. 119 of U.S. Provisional Patent Application No. 63/298,011 filed Jan. 10, 2022.

TECHNICAL FIELD

This disclosure generally relates to communications between client computing devices.

BACKGROUND

A client computing device such as a smartphone, smartwatch, personal computer, tablet, and the like, typically hosts many applications that can execute on the client device. Client devices also typically execute an operating system (OS), which can provide each application with system-level functionality or access to resources. Applications often isolate their resources from indiscriminate access by other applications, for example by using a safe name space. An inter-process communication (IPC) executing on a client computing device can process communications between applications on the device, such as by receiving a request from one application, determining the identity of a resource (e.g., second application) requested by the first application, and then routing the request and any response accordingly. Applications, therefore, do not need to know a communication channel or other communication information of every other application to communication with, or access resources from, those applications.

As an example, Android™ is one type of operating system that defines a low-layer communication channel called an "intent" that defines a common format for applications to use when making requests. Android™ also provides a system service known as "Activity Manager Service" (AMS) that handles requests between applications on a device so that each application does not need to know communication information of all other applications. For example, the AMS can translate application-provided addresses to actual channel IDs over which communication can occur. Each instance of AMS is device-specific, i.e., such that the AMS can only process communications or intents for applications on the same device on which that instance of AMS is running.

BRIEF DESCRIPTION OF THE DRAWINGS

FIG. 1 illustrates an example method providing inter-device communication.

FIG. 5 illustrates an example format for a message transmitted between proxy applications.

DESCRIPTION OF EXAMPLE EMBODIMENTS

FIG. 1 illustrates an example method 100 providing inter-device communication, e.g., between one or more applications executing on a first device and one or more applications executing on other, second devices. As explained more fully herein, the method of FIG. 1 not only enables inter-device communication, but does so while preserving transparency between applications, i.e., preserving the fact that applications need not know the identity of, or communications channels of, every other application. Thus, the systems and methods disclosed herein, such as the example method of FIG. 1, enables communication between applications on different devices without requiring application-specific code changes or updates for every application, which would make an inter-device communication unwieldy and ineffective.

Figure 2:
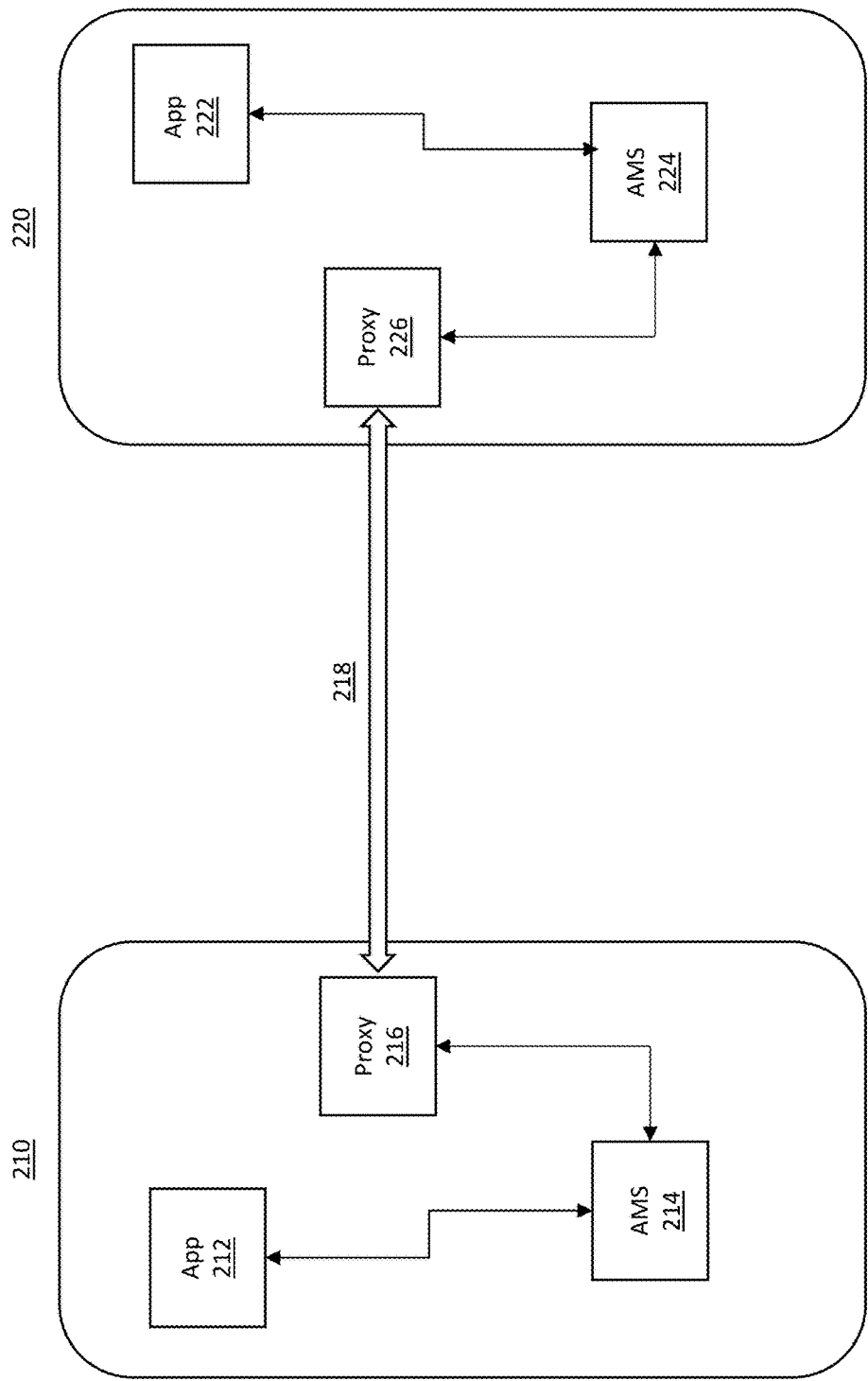
FIG. 2 illustrates an example system for inter-device communication.

The example method of FIG. 1 may include using a proxy application executing on a first client computing device and on a proxy application executing on a second client computing device. For example, FIG. 2 illustrates an example proxy application 216 executing on client device 210. FIG. 2 also illustrates proxy application 226 executing on client device 220.

Suppose an application, such as application 212 executing on client device 210, wants to access another application or access information or hardware associated with another application. For example, application 212 may be a messaging application, and a user composing a message in the application may want to take a picture of something and attach it to the message. Typically, the messaging application would not know the communication details of an application for controlling a camera and would use some protocol, such as the intent protocol of the Android™ OS, to submit a request to invoke a camera-related application. Such a request would typically be handled by, e.g., AMS 214 executing on client device 210. But if the request either cannot or should not be fulfilled by an application on client device 210, then AMS 214 would be unable to fulfill the request, for example because addresses may be dynamically initialized on device startup or OS startup, such that a channel ID on one device is meaningless on a different device. In other words, AMS 214 is limited to the fulfilling the request using the hardware and software executing locally on device 210.

Proxy application 216, working in conjunction with proxy application 226, is able to access an application 222 of another device (here, client device 220), and provide a response from application 222 as if it were executing on device 210. In addition, because application 212 does not know the identity of requesting applications, including applications that are executing on another device, in particular embodiments proxy applications 216 and 226 pass the request to application 222 as if it came from an application executing on device 220 on which application 222 is executing.

Method 100 may begin at step 110, which includes receiving, at a proxy application on a first computing device, a request from a first application on the first computing device to access a resource. The resource may be another application, a file or other piece of data, a hardware component (such as a camera or other sensor), and so on. As explained herein, this disclosure contemplates that the request from the first application may pass through one or more other processes, such as an AMS, before reaching the proxy application.

With reference to the example of FIG. 2, a request may be formatted as an intent from application 212 executing on device 210. The intent from application 212 may be passed onto a system service, such as AMS 214 executing on device 210, for processing communications between applications on the device.

Figure 3:
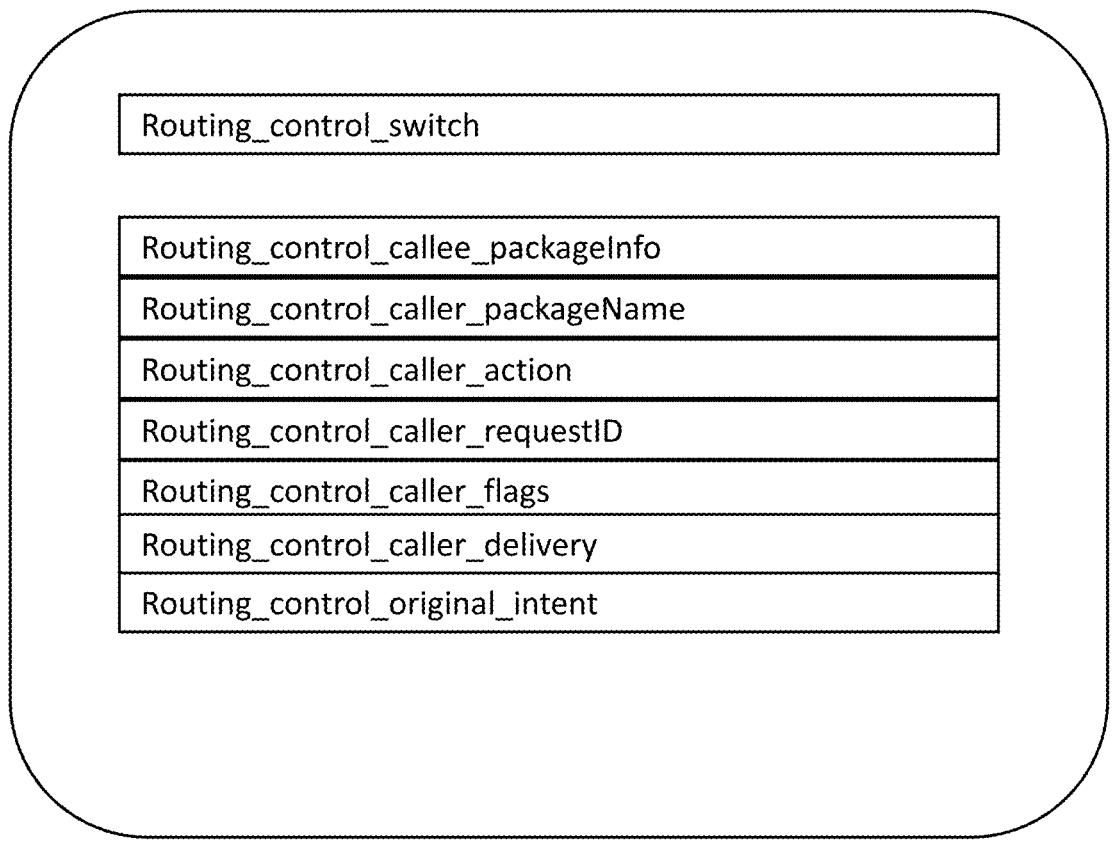
FIG. 3 illustrates an example format for processing an intent message.

AMS 214 determines how to route the intent from application 212. FIG. 3 illustrates an example embodiment for processing message 300, which may be an intent object. AMS 214 may first read data determining whether to route the original intent received from application 212 and shown as a field in FIG. 3, to another application on device 210 or whether to route the intent to proxy application 216. For example, AMS 214 may read the value of a flag "routing_control_switch," as shown in FIG. 3, and that value may determine where to route the intent from application 212. For example, a specific value such as "−1" may mean that the intent should never be routed off device 210, and therefore should not be routed to proxy application 216. In particular embodiments, another value, e.g., "1" may mean that the intent should always be routed off device 210 and therefore to proxy application 216. For example, if application 212 has been coded to integrate with functionality from proxy application 216—which, as explained more fully herein, such coding is not necessary for application 212 to receive service from proxy application 216—then application 212 may set the value of "routing_control_switch," e.g., if the application intentionally chooses to route a request off device 210 or intentionally chooses to keep the request on device 210.

In particular embodiments, application 212 may not have any code specific to proxy application 216, e.g., may not be aware of proxy application 216 or its services. In particular embodiments, application 212 may send an intent to AMS 214 without specifying any value for "routing_control_switch" and/or without including that flag. In particular embodiments, AMS 214 may lookup one or more policies specifying how to route a request in these circumstances. In particular embodiments, these policies may be set by and/or stored by proxy application 216. For example, a policy may depend on the specific request or requesting application, e.g., that a request for a picture or from a messaging application, for example, is always routed off the device and therefore to the proxy application. As another example, a policy may specify a result based on contextual information, such as whether device 210 is already connected to another device, e.g., by a Bluetooth or other communication channel, and in these circumstances a policy may specify that the intent should be routed to the connected device, through proxy application 216. As another example, a policy may specify that if a resource, e.g., a camera or other sensor, is available on the local device such as device 210, then a request initiated from that device, such as from application 212, should be served by the resource of the local device and not routed to proxy application 216. In particular embodiments, a policy may be based on resource capabilities, such as the capabilities of a local camera compared to the capabilities of camera(s) located on one or more other devices, and request may be routed off a device when a remote, off-device resource has more capabilities or is higher quality than the local resource. As discussed herein, applications do not need code changes or updates to implement the cross-device communication described herein, and moreover, because a policy determining whether and how to route requests can be created by a proxy application, the methods and systems described herein provide a great deal of flexibility in how and when cross-device communication occurs, without requiring a user to update many applications or developers to implement the functionality described herein in code. While the above example describe using a policy in the event that a "routing_control_switch" value is not specified, this disclosure contemplates that routing policies may be used even when such value is specified.

As the example of FIG. 3 illustrates, AMS 214 may read the value of "routing_control_switch" to determine how to route the request from application 212. As shown in FIG. 3, AMS 214 may create a message, such as an intent, that includes the original intent from application 212 as well as additional fields, such as a requestID, so that the intent can be properly routed and processed as disclosed more fully herein. For example, after receiving an intent from a requesting application such as application 212 on device 210, an AMS would typically invoke an API call, such as startActivityForResult, for example in order to start an activity and receive a response back from a local application. Calling this API may require several inputs or parameters, such as for example the fields other than "routing_control_switch" shown in FIG. 3. In order for another program on another device, such as AMS 224 on device 220, to call this API and receive a result from an application, the other program such as AMS 224 would need the inputs necessary to call the API. Thus, as shown in FIG. 3, after receiving an intent, AMS 214 may add the inputs that would normally be used to invoke an API call to an intent object. As explained more fully herein, this intent object may be passed through proxy application 216 to another device, such as device 220, where it is processed by proxy application 226. Either proxy application 226 or AMS 224 may read the intent object to extract the inputs necessary to make the API call local to the device, and therefore to receive a response from an application on that device despite the fact that the original intent did not originate on that device.

Figure 4:
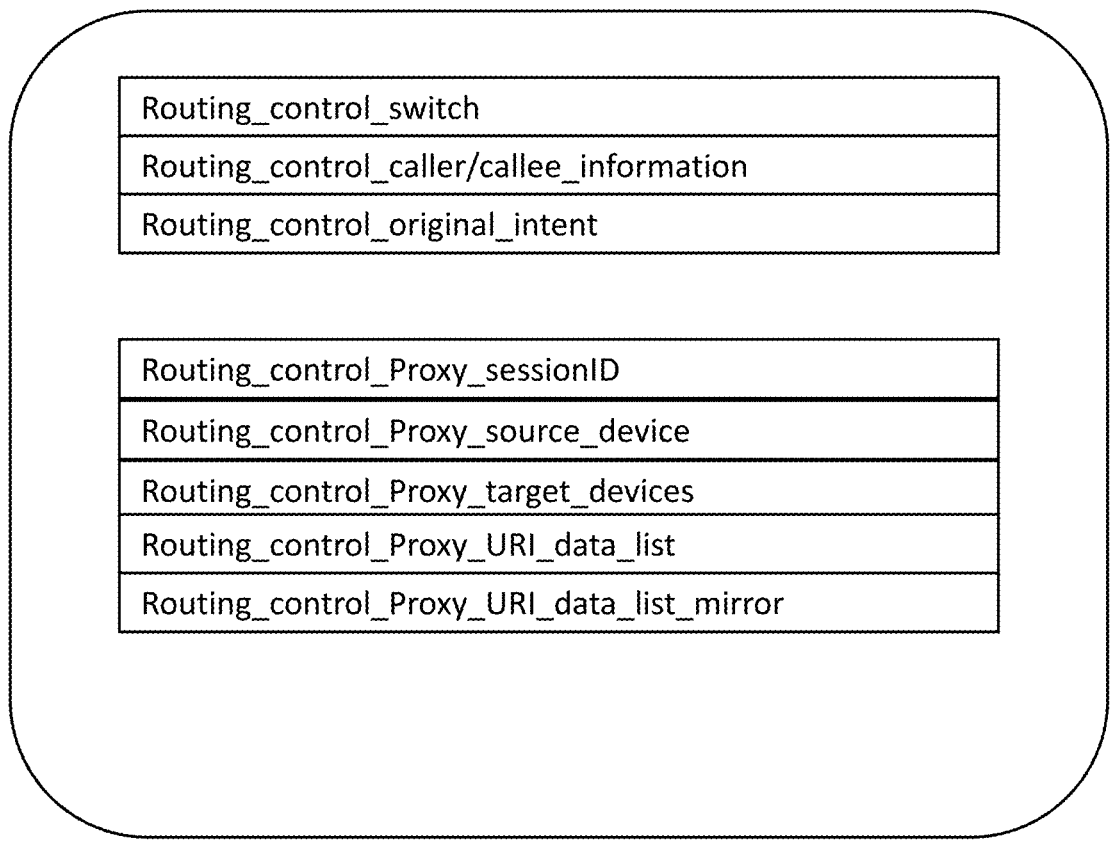
FIG. 4 illustrates an example format of an intent modified by a proxy application.

When the value of "routing_control_switch" and/or the policies associated with a routing decision determine that the request should be sent to proxy application 216, then AMS 214 routes the intent (for example, the intent shown in FIG. 3) to proxy application 216 on device 210. Proxy application 216 may then update the intent, for example as shown in FIG. 4. As shown in FIG. 4, modified intent 400 includes the original intent from application 212 and caller/callee information, among other things. Proxy application 212 adds additional fields, such as for example a sessionID field specifying an identification of the session (or request) for recordkeeping purposes. Proxy application 216 may also specify an ID of the source device (e.g., device 210), an ID of one or more target devices (e.g., device 220, among other devices), a list of uniform resource identifiers (URI data list) and a field mapping URIs on the requesting device 210 with URIs that will be provided by another device, e.g., the "Uri data list mirror" field.

In particular embodiments, proxy application 216 may create and maintain one or more records for a request session. For example, the record may include a session ID, which may also identify the requesting device, and may list potential or actual target devices for fulfilling the request. The record may include a state machine that tracks the current state of the request, such as "sender preprocessing" when proxy application 216 is processing the request, "receiver preprocessing" when a request is transmitted and the second device is processing the request, "response received" when a response is received by proxy application 216 from a second application, and so on. In particular embodiments, the state machine is used for each target device specified in a particular session, so that, for example, if a request is sent to multiple devices then the status of the request for each device is tracked by a state machine associated with that device.

In particular embodiments, the record may specify for each target device a list of URIs created by the sending device (e.g., by device 210). For example, suppose a messaging application submits a request for a photo, e.g., from a camera. The messaging in application (or the AMS) may create a URI identifying the address on the local device at which the resulting photo should be placed. However, since the application is expecting the request to be fulfilled locally, the URI is not meaningful outside of the local device, i.e., the URI is not sufficient outside of the local device to identify the address at which the photo should be placed. Likewise, as explained more fully herein, when a request that is fulfilled by a second device, the second device may create some content, e.g. a photo, at an address specified locally on the second device by a URI, and that second-device URI would not be usable outside of the second device, e.g., the requesting device would not be able to take the URI from the second device and know where to get the resource. In particular embodiments, one or more records of proxy applications 216 specify one or more local URIs, each identifying a local address at which a resource should be placed to fulfill a request.

Example method 100 of FIG. 1 includes step 120, which may include transmitting, from the proxy application on the first computing device, a modified version of the request to a proxy application on a second computing device. For example, as shown in FIG. 2, proxy application 216 may transmit a request to proxy application 226 on device 220 over communication channel 218. Communication channel 218 may take any suitable form, such as Bluetooth, Wifi, wired communication, or any other suitable way of communicating between two devices. In particular embodiments, the communication from proxy application 216 to proxy application 226 over channel 218 is in a serializable format.

FIG. 5 illustrates an example format for a message transmitted between proxy applications, such as proxy application 216 and 226. Specifically, FIG. 5 illustrates a packet format for transmitting a request from proxy application 216 to proxy application 226, specifying information such as the total size of the message, that the message is an intent combined with URI data, etc. In particular embodiments, if a request involves multiple URI resources, then the intent data and URI data may be sent separately. For example, the original message could specify "Buffer type: intent only" and the receiving proxy application could request the first device to send the remaining URI data in parallel, e.g., by transmitting a message containing "buffer type: query Uri (int)" to the first device, and receive the URI data in response.

When proxy application 226 receives a communication from proxy application 216, proxy application 226 creates an intent message for distribution locally on device 220. In particular embodiments, proxy application 226 may adjust the value of the "routing_control_switch" field, for example by setting the value so that the intent is never routed off device, so that when AMS 224 of device 220 receives the intent from proxy application 226, AMS 224 does not attempt to re-route the request off the device.

In particular embodiments, proxy application 226 may create a local URI (e.g., on device 220) for each URI created for the original intent on device 210. Proxy application 226 may then send the original intent on to AMS 224, but with the original intent modified so that it appears, from the perspective of AMS 224, as if the request came from an application local to device 220. For example, proxy application 226 may replace any requesting ID or address information (such as the identity or address of application 212 on device 210) with the identity and address information of proxy application 226 on device 220. In addition, proxy application 226 may replace any URI information created for the original request on device 210 with local URIs created by proxy application 226. In particular embodiments, proxy application 226 may record the local URIs in, e.g., the "URI data list mirror field" of the message received from proxy application 216. In particular embodiments, proxy application 226 may create one or more records, similar to the records described above in connection with proxy application 216, for the request. For example, a record created by proxy application 226 may specify the session ID, the state, URIs, and the identity of the source device.

Proxy application 226 may forward the modified original intent to AMS 224 on device 220. From the perspective of the processing of AMS 224, the intent received by AMS 224 from proxy application 226 appears to be an intent generated locally on device 220. Therefore, AMS 224 processes the request as an ordinary intent, e.g., by invoking an API or by otherwise transmitting the request to a local resource (e.g., application 222 on device 220), receiving a response (including any URIs identify the address of resources created by, e.g., application 222 in fulfilling the request), and transmitting a response back to proxy application 226.

Upon receiving the response from AMS 224, proxy application 226 may update the intent for transmission back to proxy application 216 on device 210. For example, proxy application 226 may update the original intent with the response from the local resource on device 220, e.g., with the response from application 222. As another example, proxy application 226 may update the message received from proxy application 216, such as the intent shown in FIG. 4, with code or other data that indicates the state of the request, such as whether the request was correctly handled or cancelled. In addition, proxy application 226 may update the mapping of URI's local to device 220 and local to device 210. For example, proxy application 226 may identify which resources created by device 220 should correspond to a first URI created by the request on device 210, i.e., which resource should be stored at the address identified by that URI. Proxy application 226 may perform the same process for additional URIs, as necessary.

In particular embodiments, responsive data, such as a string, generated by the application fulfilling the request may be placed in the original intent. If the responsive data is not too large, then all of the responsive data may be placed in the original intent and sent to the requesting application via the proxy application on that device, and in those embodiments, URIs may not need to be generated either by the requesting device or by the fulfilling device, or both. In particular embodiments, responsive data, such as an image, may be too large to fit into the original intent and in those instances the resulting data may be passed to the requesting device along with the URI(s) associated with the resulting data.

Method 100 of FIG. 1 may include step 130, which may include receiving, from the proxy application on the second computing device, a response including data from the requested resource, where the resource is on the second computing device. As an example, upon receiving a response from proxy application 226 on device 220, proxy application 216 on device 210 may synchronize URI data, such as URI data in "URI data list mirror" created by proxy application 226 with URI data in "URI data list," shown in FIG. 4, created as part of the request on device 210. For example, proxy application 216 may create any new URIs as necessary to store the resources created by device 220 in response to the request that do not correspond to a URI created on device 210 when generating the request. Proxy application 216 may then fetch the data at the URI(s) corresponding to device 220, e.g., fetch the data from device 220 as specified by the URIs in, e.g., "URI data list mirror", and store the data in the corresponding URIs on device 210, as specified in, e.g., the mapping between "URI data list" and "URI Data list mirror." Proxy application 216 may also update the original intent to refer to URIs on device 210, as the original intent may have been modified by proxy application 226 while preparing the intent request on that device.

Method 100 of FIG. 1 may include step 140 which may include transmitting, to the first application on the first computing device, a response satisfying the first application's request to access the resource, wherein the response refers to or includes at least some of the data from the resource on the second computing device. For example, after synchronizing URIs and corresponding data, proxy application 216 may pass the original intent with updated URIs (or with responsive data, if that data is not too large) to AMS 214, and that response appears to AMS 214 as if it came locally from device 210, i.e., as if resource 222 on device 220 was actually on device 210. AMS 214 transmits the intent response to the requesting application, such as application 212, which may then use the resource for the requested purpose. For example, AMS 214 may transmit the original intent, as updated by the applications running on device 220, and also data indicating the state of the request to the requesting application, as explained more fully herein.

Particular embodiments may repeat one or more steps of the method of FIG. 1, where appropriate. Although this disclosure describes and illustrates particular steps of the method of FIG. 1 as occurring in a particular order, this disclosure contemplates any suitable steps of the method of FIG. 1 occurring in any suitable order. Moreover, although this disclosure describes and illustrates particular components, devices, or systems carrying out particular steps of the method of FIG. 1, this disclosure contemplates any suitable combination of any suitable components, devices, or systems carrying out any suitable steps of the method of FIG. 1. Moreover, this disclosure contemplates that some or all of the computing operations described herein, including certain steps of the example method illustrated in FIG. 1, may be performed by circuitry of a computing device described herein, by a processor coupled to non-transitory computer readable storage media, or any suitable combination thereof.

In particular embodiments, a proxy application may provide window-manager or other UI functionality when processing a request. For example, when an application submits a request, some processes, such as some intent processes, may require certain window operations. For example, if application 212 on device 210 in FIG. 2 requests to access a camera, then the request may expect that a new UI (e.g., of a camera application) will open during the request, and the request may error if the new window does not open. In addition, even if not required, a UI may communicate information to the user such as the status of the request or various options.

For example, with reference to the example of FIG. 2, upon receiving a request proxy application 216 may surface a UI that lets a user select which remote device, e.g., from a stored list of remote devices, to submit a request to, and/or lets a user approve or deny submitting a request to a particular device. On device 220, proxy application 226 may surface a UI that, e.g., identifies the request and the source of the request and lets the user of device 220 accept or deny the request. If accepted, the UI on device 220 may move to the utilized resource, e.g., to a UI of a camera application. Device 220 may present a UI to the user when proxy application 226 is processing and/or has completed fulfilling the request, such as a UI that identifies the status of the request. Upon receiving a response from proxy application 226, device 210 may surface a UI to a user that, e.g., identifies the result or resource received from the second device and lets the user continue or abort the operation. If continued, ultimately the UI of device 210 will end up back on the original UI associated with the application that initiated the request, e.g., a UI of application 210 such a messaging application.

While the examples above often refer to a requesting application as being a messaging application and the responding application as being a camera-related application, this disclosure contemplates any suitable requesting and responding application. For example, a requesting application may need a bar code to be scanned, and may either not have a bar-code scanner local to the device or may need a bar code scanned that is not local to the device, and therefore the requesting application needs to access a bar-code reader on a different device. As another example, a user may, e.g., compose an email or message on a device that has a larger screen or dedicated keyboard, while sending the email from a requesting device that has less capability, such as a smartwatch or smartphone. As another example, when a user wants someone to take a picture of them the user normally hands their local device, such as their smartphone, to another person to take the picture. However, the user could instead submit a request from their device that is fulfilled by a device of the user taking the picture, and the resulting picture would be transmitted back to the requesting user's device, all without the need to physically handle another user's device. As this example illustrates, communication need not only be between devices that are located in physically distant or different places. As another example, one user could handle forms, such as entering credentials or other information, for a requesting user when the requesting user's device passes such requests on to another device.

While the examples and certain figures herein describe and illustrate inter-device communication in the specific contexts of intents and an AMS as used in the Andriod™ OS, this disclosure contemplates that the systems and techniques described herein may be used on any suitable protocol and/or IPC framework, and on other Os's.

Figure 6:
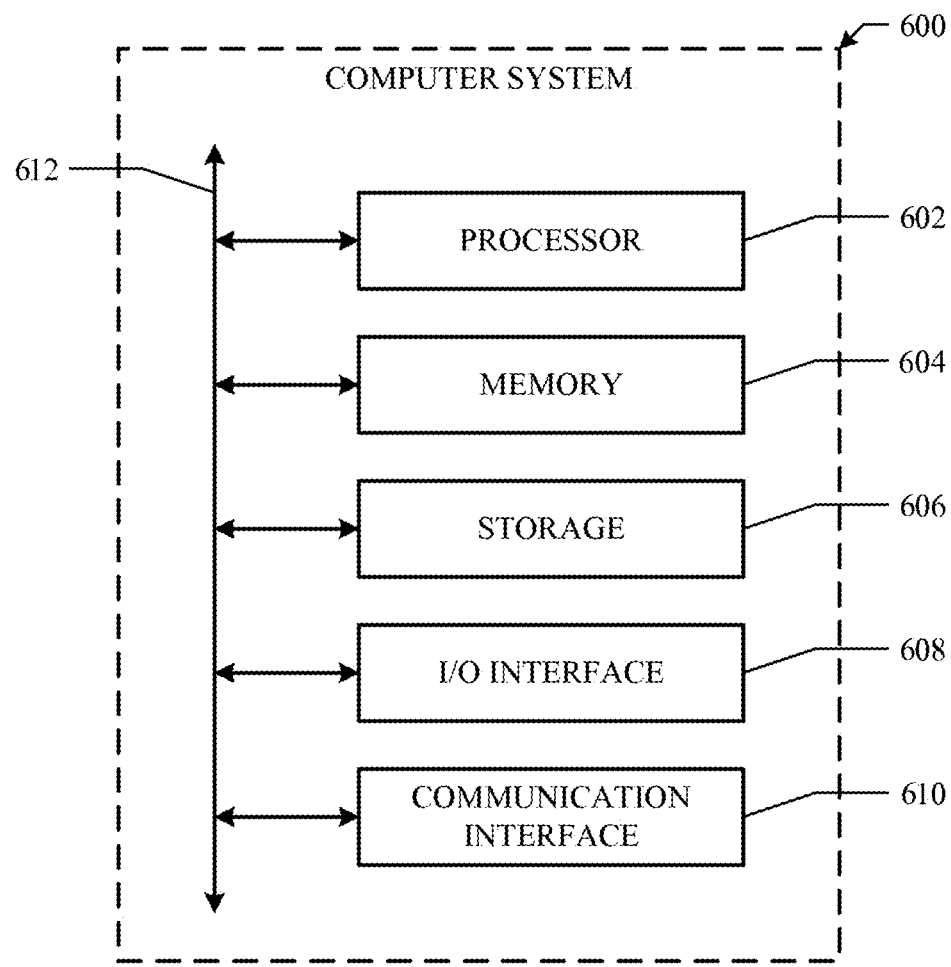
FIG. 6 illustrates an example computing device.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A method comprising:
   accessing, by a first computing device, a request from a first application on the first computing device to access a particular resource;
   determining, by the first computing device, whether to satisfy the access request from the first application by a resource on the first computing device or by a resource on another device;
   in response to a determination that the access request will be satisfied by a resource on another device, then receiving, at a proxy application on the first computing device, the request from the first application on the first computing device to access the particular resource, wherein the request from the first application is sent to the proxy application on the first computing device by a process executing on the first computing device that satisfies access requests using resources on the first computing device;
   transmitting, from the proxy application on the first computing device, a modified version of the request to a proxy application on a second computing device;
   receiving, from the proxy application on the second computing device, a response comprising data from a resource on the second computing device; and
   transmitting, to the first application on the first computing device, a response satisfying the first application's request to access the particular resource.

2. The method of claim 1, wherein:
   from the perspective of the first application on the first computing device, the response from the proxy application on the first computing device appears to be provided by an instance of the particular resource executing on the first computing device; and
   from the perspective of the second application on the second computing device, a request from the second proxy application on the second computing device to access the resource on the second computing device appears to be made by an instance of the first application executing on the second computing device.

3. The method of claim 1, wherein the request comprises an intent object.

4. The method of claim 1, wherein the modified request comprises a security check to determine whether the first computing device has permission to access the resource on the second computing device.

5. The method of claim 1, further comprises creating one or more policies determining whether to route a request from an application on the first computing device to the proxy application on the first computing device.

6. The method of claim 1, further comprising providing, in response to receiving the request from the first application, a UI on the first device identifying the request and one or more second computing devices to which the request may be transmitted.

7. The method of claim 1, further comprising creating, on the first computing device, a uniform-resource identifier (URI) identifying a location on the first computing device at which to store at least part of the response.

8. A system comprising one or more processors and a non-transitory computer readable storage media embodying instructions coupled to the one or more processors, the one or more processors operable to execute the instructions to:
 access, by a first computing device, a request from a first application on the first computing device to access a particular resource;
 determine, by the first computing device, whether to satisfy the access request from the first application by a resource on the first computing device or by a resource on another device;
 in response to a determination that the access request will be satisfied by a resource on another device, then receive, at a proxy application on the first computing device, the request from the first application on the first computing device to access the particular resource, wherein the request from the first application is sent to the proxy application on the first computing device by a process executing on the first computing device that satisfies access requests using resources on the first computing device;
 transmit, from the proxy application on the first computing device, a modified version of the request to a proxy application on a second computing device;
 receive, from the proxy application on the second computing device, a response comprising data from a resource on the second computing device; and
 transmit, to the first application on the first computing device, a response satisfying the first application's request to access the particular resource.

9. The system of claim 8, wherein:
 from the perspective of the first application on the first computing device, the response from the proxy application on the first computing device appears to be provided by an instance of the particular resource executing on the first computing device; and
 from the perspective of the second application on the second computing device, a request from the second proxy application on the second computing device to access the resource on the second computing device appears to be made by an instance of the first application executing on the second computing device.

10. The system of claim 8, wherein the request comprises an intent object.

11. The system of claim 8, wherein the modified request comprises a security check to determine whether the first computing device has permission to access the resource on the second computing device.

12. The system of claim 8, wherein the one or more processors are further operable to execute the instructions to create one or more policies determining whether to route a request from an application on the first computing device to the proxy application on the first computing device.

13. The system of claim 8, wherein the one or more processors are further operable to execute the instructions to provide, in response to receiving the request from the first application, a UI on the first device identifying the request and one or more second computing devices to which the request may be transmitted.

14. The system of claim 8, wherein the one or more processors are further operable to execute the instructions to create, on the first computing device, a uniform-resource identifier (URI) identifying a location on the first computing device at which to store at least part of the response.

15. One or more non-transitory computer readable storage media embodying instructions and coupled to one or more processors that are operable to execute the instructions to:
 access, by a first computing device, a request from a first application on the first computing device to access a particular resource;
 determine, by the first computing device, whether to satisfy the access request from the first application by a resource on the first computing device or by a resource on another device;
 in response to a determination that the access request will be satisfied by a resource on another device, then receive, at a proxy application on the first computing device, the request from the first application on the first computing device to access the particular resource, wherein the request from the first application is sent to the proxy application on the first computing device by a process executing on the first computing device that satisfies access requests using resources on the first computing device;
 transmit, from the proxy application on the first computing device, a modified version of the request to a proxy application on a second computing device;
 receive, from the proxy application on the second computing device, a response comprising data from a resource on the second computing device; and
 transmit, to the first application on the first computing device, a response satisfying the first application's request to access the particular resource.

16. The media of claim 15, wherein:
 from the perspective of the first application on the first computing device, the response from the proxy application on the first computing device appears to be provided by an instance of the particular resource executing on the first computing device; and
 from the perspective of the second application on the second computing device, a request from the second proxy application on the second computing device to access the resource on the second computing device appears to be made by an instance of the first application executing on the second computing device.

17. The media of claim 15, wherein the request comprises an intent object.

18. The media of claim 15, wherein the modified request comprises a security check to determine whether the first computing device has permission to access the resource on the second computing device.

19. The media of claim 15, wherein the one or more processors are further operable to execute the instructions to create one or more policies determining whether to route a request from an application on the first computing device to the proxy application on the first computing device.

20. The media of claim 15, wherein the one or more processors are further operable to execute the instructions to provide, in response to receiving the request from the first application, a UI on the first device identifying the request and one or more second computing devices to which the request may be transmitted.

* * * * *